United States Patent
Hastings et al.

(10) Patent No.: US 7,024,381 B1
(45) Date of Patent: Apr. 4, 2006

(54) APPROACH FOR RENTING ITEMS TO CUSTOMERS

(75) Inventors: W. Reed Hastings, Santa Cruz, CA (US); Marc B. Randolph, Santa Cruz, CA (US); Neil Duncan Hunt, Mountain View, CA (US)

(73) Assignee: Netflix, Inc., Los Gatos, CA (US)

( * ) Notice: Subject to any disclaimer, the term of this patent is extended or adjusted under 35 U.S.C. 154(b) by 89 days.

(21) Appl. No.: 10/438,727

(22) Filed: May 14, 2003

Related U.S. Application Data

(63) Continuation of application No. 09/561,041, filed on Apr. 28, 2000, now Pat. No. 6,584,450.

(51) Int. Cl.
*G06F 15/16* (2006.01)
*G06F 17/60* (2006.01)
*H04N 7/173* (2006.01)

(52) U.S. Cl. .......................... 705/26; 381/77; 709/206; 725/60; 725/104

(58) Field of Classification Search .................. 705/26; 709/206, 212, 219, 222; 725/60, 104; 381/77, 381/81, 86
See application file for complete search history.

(56) References Cited

U.S. PATENT DOCUMENTS

| | | | |
|---|---|---|---|
| 5,095,195 A | | 3/1992 | Harman et al. |
| 5,664,110 A | | 9/1997 | Green et al. |
| 5,704,017 A | | 12/1997 | Heckerman et al. |
| 5,752,160 A | * | 5/1998 | Dunn .......................... 725/93 |
| 5,790,426 A | | 8/1998 | Robinson |
| 5,842,199 A | | 11/1998 | Miller et al. |
| 5,861,906 A | * | 1/1999 | Dunn et al. .................... 725/87 |
| 5,884,282 A | | 3/1999 | Robinson |
| 5,918,014 A | | 6/1999 | Robinson |
| 5,918,213 A | | 6/1999 | Bernard et al. |
| 5,945,987 A | * | 8/1999 | Dunn .......................... 345/718 |
| 5,959,945 A | * | 9/1999 | Kleiman ....................... 381/81 |
| 6,012,052 A | | 1/2000 | Altschuler et al. |

(Continued)

FOREIGN PATENT DOCUMENTS

JP 2001243285 A 9/2001

OTHER PUBLICATIONS

Kenton County Public Library, Covington, KY 41011, The Talking Book Library at the Kenton County Public Library, "http://web.archive.org/web/19980130051137/www.kenton.lib.ky.us/talking.html," 3 pages.*

(Continued)

*Primary Examiner*—Andrew Joseph Rudy
(74) *Attorney, Agent, or Firm*—Hickman Palermo Truong & Becker, LLP

(57) ABSTRACT

According to a computer-implemented approach for renting items to customers, customers specify what items to rent using item selection criteria separate from deciding when to receive the specified items. According to the approach, customers provide item selection criteria to a provider provides the items indicated by the item selection criteria to customer over a delivery channel. The provider may be either centralized or distributed depending upon the requirements of a particular application. A "Max Out" approach allows up to a specified number of items to be rented simultaneously to customers. A "Max Turns" approach allows up to a specified number of item exchanges to occur during a specified period of time. The "Max Out" and "Max Turns" approaches may be used together or separately with a variety of subscription methodologies.

51 Claims, 7 Drawing Sheets

U.S. PATENT DOCUMENTS

| | | | |
|---|---|---|---|
| 6,016,475 | A | 1/2000 | Miller et al. |
| 6,029,161 | A | 2/2000 | Lang et al. |
| 6,041,311 | A | 3/2000 | Chislenko et al. |
| 6,049,777 | A | 4/2000 | Sheena et al. |
| 6,065,042 | A * | 5/2000 | Reimer et al. ............... 709/203 |
| 6,067,562 | A * | 5/2000 | Goldman .................... 709/206 |
| 6,092,049 | A | 7/2000 | Chislenko et al. |
| 6,108,493 | A | 8/2000 | Miller et al. |
| 6,112,186 | A | 8/2000 | Bergh et al. |
| 6,236,985 | B1 | 5/2001 | Aggarwal et al. |
| 6,286,139 | B1 | 9/2001 | Decinque |
| 6,289,389 | B1 * | 9/2001 | Kikinis ....................... 709/239 |
| 6,308,168 | B1 | 10/2001 | Dovich et al. |
| 6,321,179 | B1 | 11/2001 | Glance et al. |
| 6,321,221 | B1 | 11/2001 | Bieganski |
| 6,334,127 | B1 | 12/2001 | Bieganski et al. |
| 6,389,372 | B1 | 5/2002 | Glance et al. |
| 6,412,012 | B1 | 6/2002 | Bieganski et al. |
| 6,484,123 | B1 | 11/2002 | Srivastava |
| 6,487,539 | B1 | 11/2002 | Aggarwal et al. |
| 6,487,541 | B1 | 11/2002 | Aggarwal et al. |
| 6,496,816 | B1 | 12/2002 | Thiesson et al. |
| 2001/0036271 | A1* | 11/2001 | Javed .......................... 380/217 |
| 2005/0086127 | A1 | 4/2005 | Hastings et al. |

OTHER PUBLICATIONS

The Library of Congress, Requests Proposals on Behalf of the National Library Service for the Blind and Physically Handicapped for the Software Support Services for Library □□Owned Software Knonw as "Reads" Reader Enrollment and Delivery System.*

Library of Congress, Washington, DC; Solicitation No. RFP 87-16; 17 (seventeen) pages; Sep. 1, 1987.*

Matsuyama, Toshnori, Rental Video Tape Order System, Pub. No. 09-231279 (JP 9231279 A), Application No. 08-057043 JP 9657043).*

Glenn Miller, Letter from Glen Miller, Director of Orange County Library System, Unabashed Librarian, No. 82, p. 3, 1991.*

Business Wire, "Netflix.com transforms DVD Business Eliminating Late Fees and Due Dates From Movie Rentals; NetFlix.com's New Marquee Program Creates Near DVD-on-Demand," New York, Sep. 28, 1999, 3 pgs.*

Billboard, "NetFlix launches DVd subcription club; Blockbuster set to stock up on formate" [sic] Billboard, New York, Oct. 16, 1999, vol. 111, Iss. 42, p. 77.*

Brad Dick, Editor, "The Future of Television," Broadcast Engineering, NA, Dec. 1999, 1 page.

"About Us" web page from www.netflix.com, 1 page.

Web page printout for http://www.netflix.com/ on Jan. 17, 1999, at http://web.archive.org/web/19990117080920/http://www.netflix.com, 5 pages.

"Facts About the Library," a section of book entitled "Oh! Say. Can You See . . . " 1992 American Action Fund for Blind Children and Adults, retrieved from http://web.archive.org/web/20000104114940/www.actionfund.org/saysee09.htm, 2 pages.

Application for Library Services for the Kenneth Jernigan Library for Blind-Children, last updated May 27, 1999, retrieved from http://web.archive.org/web/19991103190509/www.actionfund.org/kjlib.htm, 3 pages.

Audio Diversions Home Page, last updated Mar. 8, 1999 [online] retrieved on Feb. 26, 2004 from http://web.archive.org/web/19990508140319/www.audiodiversions.com/audiodiversions-cgi/home.cgi; 2 pages.

Literature for Listening Club of Audio Diversions, last updated Mar. 12, 1999 [online] retrieved on Aug. 31, 2003 from http://web.archive.org/web/19990908120905/www.audiodiversions.com/audiodiversions-cgi/listening.cgi?id=0508075008; 2 pages.

Audiobook Search of Audio Diversions [online] retrieved on Aug. 31, 2003 from http://web.archive.org/web/19990908104726/www.audiodiversions.com/audiodiversions-cgi/catalog.cgi?id=0508075008, 2 pages.

Books On Tape Home page, Apr. 22, 1999 [online] retrieved on Aug. 31, 2003 from http://web.archive.org/web/19990424061355/http://www.booksontape.com/, 2 pages.

More About B-O-T® & Frequently Asked Questions, [online] retrieved on Aug. 31, 2003 from http://web.archive.org/web/19990508223402/http://www.booksontape.com/i/help.htm, 11 pages.

America's Online Door to Door Rental Store, 1999 copyright [online] retrieved from http://web.archive.org/web/19990922160527/http://www.dvdovernight.com/; 2 pages.

Getting Started, 1999 copyright [online] retrieved from http://web.archive.org/web/2000030411243/www.dvdovernight.com/started.html; 7 pages.

Top DVD Rentals, DVD Overnight store Policies & Frequently Asked Questions, 1999 copyright [online] retrieved from http://web.archive.org/web/19991123014901/www.dvdovernight.com/service.html; 8 pages.

Customer Service Questions & Answers, 2000 copyright [online] retrieved from http://web.archive.org/web/20001109071400/www.dvdovernight.com/dvd/custservice.html; 5 pages.

DVD Cache Frequently Asked Questions, [online] retrieved from http://web.archive.org/web/20000512001209/www.dvdcache.com/store/customer_service.html; 5 pages.

Libraries [online] retrieved on Feb. 26, 2004 from http://www.archives.mcgill.ca/resources/guide/vol1/rg40.htm; 8 pages.

Fastlane Video & Records—Rental Prices [online] retrieved from http://web.archive.org/web/19990506190744/members.aol.com/atfastlane/video/rental.htm; 1 page.

5 Day Rental [online] retrieved from http://web.archive.org/web/19990210101315/members.aol.com/atfastlane/video/index.htm; 13 pages.

Fastlane Video & Records [online] retrieved from http://web.archive.org/web/19990209181937/members.aol.com/atfastlane/; 2 pages.

Fastlane Vidoe & Records—Payment on Account [online] retrieved from http://web.archive.org/web/19990504102814/members.aol.com/atfastlane/video/payment.htm; 1 page.

"Try Before You Buy Program" [online] retrieved from http://web.archive.org/web/19990922040420/www.gametradersclub.com/gametradersclub/tryb.html; 2 pages.

Trade or Sell Your Games! [online] retrieved from http://web.archive.org/web/19991010012624/www.gametradersclub.com/gametradersclub/tradorselyou.html; 2 pages.

"Try Before You Buy Program" [online] retrieved from http://web.archive.org/web/19991012021059/gametradersclub.com/gametradersclub/tryb.html; 2 pages.

Print Culture and English Speaking Quebec [online] retrieved on Feb. 26, 2004 from http://www.hbic.library.utoronto.ca/fconfmcnally_fr.htm; 5 pages.

Welcome to Home Film [online] retrieved from http://web.archive.org/web/19961106000542/http://www.homefilmfestival.com/index.html; 3 pages.

Membership [online] retrieved from http://web.archive.org/web19961106001054/www.homefilmfestival.com/membership.html; 2 pages.

It's Easy! Ordering info [online] retrieved from http://web.archive.org/web/19961106001006/www.homefilmfestival.com/infopack.html; 2 pages.

Online Video Rentals Multiple Rental Order Form [online] retrieved on Jul. 2, 2003 from http://web.archive.org/web/19990420045928/www.homefilmfestival.com/1rgordr.html; 3 pages.

Online Video Rentals Individual Rental Order [online] retrieved on Jul. 2, 2003 from http://web.archive.org/web/19990127160422/www.homefilmfestival.com/indordr.html; 3 pages.

Magic Disc Entertainment [online] retrieved on Feb. 27, 2004 from http://web.archive.org/web/19981206142316/http://www.magicdisc.com/; 2 pages.

Rental Program [online] retrieved from http://web.archive.org/web/19990503073644/www.magicdisc.com/rentals/rentalprogram.htm; 3 pages.

Featured DVDs for Saturday, Jan. 16, 1999, 1997-1999 copyright [online] retrieved on Jul. 3, 2003 from http://web.archive.org/web/19990117011532/http://www.netflix.com/; 5 pages.

DVD Favorites, 1997-1999 copyright [online] retrieved on Jul. 3, 2003 from http://web.archive.org/web/19991204131346/www.netflix.com/sf/favorites.asp?sid=14; 4 pages.

Future Reflections, Barbara Cheadle, vol. 12, No. 1 Winter, 1993 [online] retrieved on Aug. 23, 2003 from http://www.nfb.org/fr/fr1/93win.htm; pp. 1-2; 70-72.

Hear Ye! Hear Ye! National Federation of the Blind archived in Feb. 1999 retrieved from http://web.archive.org/web/19991112190729/www.nfb.org/fr98ws20.htm, 7 pages.

E-mail posting: Newgroups: alt.games.video.sony-playstation from:David Esposito (cooldej@home.com) with subject: Need Cheep Games; Date: Feb. 7, 1999; 1 page.

E-mail posting: Newgroups: alt.games.video.sony-playstation from:ramon (ramon@theriver.com) with subject: Need Cheep Games; Date: Feb. 8, 1999; 1 page (same page as Esposito posting).

E-mail posting: Newgroups: alt.games.video.sony-playstation from:ramon (ramon@theriver.com) with subject: 100'S of Games for about a Buck a Day . . . (Incredible Deal); Date: Feb. 6, 1999; 1 page.

E-mail posting: Newsgroups: alt.games.video.sony-playstation from: ramon (ramon@theriver.com) with subject: Best Deal Around 100's of games for about a buck a day; Date; Feb. 8, 1999; 1 page.

E-mail posting: Newsgroups: alt.games.video.sony-playstation from: ramon (ramon@theriver.com) with subject: Best Deal I've Ever Seen . . . 100's of games for about a buck a day; Date: Feb. 8 1999; 1 page.

E-mail posting: Newsgroups: alt.games.video.sony-playstation from: ramon (ramon@theriver.com) with subject: Best Deal Ever!! Choose from 100's of games for about a buck a day . . . Plus a Free Playstation; Date: Feb. 9, 1999; 1 page.

E-mail postings of 6 messages in a thread from the following message: Newsgroups: alt.games.video.sony-palystation from: ramon (ramon@theriver.com) with subject: Best Deal Ever..All the N-64 Games You Want for About a Buck a Day; Date: Feb. 10, 1999; 3 pages.

E-mail posting: Newsgroups: alt.games.video.sony-palystation from: ramon (ramon@theriver.com) with subject: All the New Playstation Games are Yours for About a Buck a Day; Date: Feb. 10, 1999; 1 page.

E-mail posting: Newsgroups: alt.games.video.sony-palystation from: ramon (ramon@theriver.com) with subject: Check Out the New Web Site (Best Deal I've Seen); Date: Jul. 11, 1999; 1 page.

E-mail posting: Newsgroups: alt.games.video.sony-palystation from: ramon (ramon@theriver.com) with subject: How Many Games Can You Beat In A Month?; Date: Jul. 11, 1999; 1 page.

"A New Way to Avoid Exercise", Newsweek Mar. 15, 1999; 1 page.

Additional Information from Sally Fry, Community Relations Coordinator Unabashed Librarian, No. 82, p. 3 1991.

Mailbox Access to Your Library (MAYL), Florida Libraries, Unabashed Librarian, No. 82, p. 3 1991.

Brass, Kevin, "Company Town: Rental Control; Video Distributor Takes Industry Down Controversial Path", *Los Angeles Times*, Nov. 28, 1997; 4 pages.

Mary L. Daniels, A Love for Libraries; Whether Large or Small, They are Special Places, Editorial; p. A19, Orlando Sentinel, Nov. 11, 1994; 2 pages.

DeJong, Jennifer, "Securing Your Site for the Age of E-Commerce", VAR Business Strategy Guide Supplement Nov. 16, 1998; 3 pages.

"Door-to-Door Service", High Points, Feb. 1999; vol. 6, No. 2, p. 50, 2 pages.

Greenemeier, Larry, "Manna Rises Above Conventional", Net Marketing; Manna Network Technologies Midrange Systems, Dec. 18, 1998; No. 18, vol. 11; p. 41; 2 pages.

Hilda M. Hamlyn, "Eighteenth-century circulating libraries in England," The Library, pp. 197-222, Dec. 1946.

Horowitz, Alan, S., "PC Leasing Gains Ground—Shorter life spans poularize practice", Information Week, May 25, 1998, 3 pages.

Ingram, Bob, "Boston Bears Watching" Supermarket Business Mar. 1, 1999; 5 pages.

Kim, Nancy J., "Nordstrom seen Net gains with Streamline", Puget Sound Business Journal Oct. 30, 1998; 2 pages.

Alan Donald McKillop, "English circulating libraries, 1725-50" The Library, pp. 477:-485, Mar. 1934.

Memmott, Carol, "Web Site Streamlines Your Errands", USA Today Nov. 16, 1998; 2 pages.

"News Briefs", Video Store Mar. 21, 1999; 1 page.

"Nordstrom Announces Partnership With Streamline", PR NewsWire Oct. 8, 1998; 2 pages.

Said, Carolyn, "Chips and Flicks On Your Doorstep", Business, p. B1, The San Francisco Chronicle, Oct. 18, 1999, 4 pages.

Shrieves, Linda, "Now Library Books Just Show Up at Your Door", Orlando Sentinel, Dec. 7, 1990; 2 pages.

"Streamline" DSN SuperCenter Club Business Mar. 29, 1999; 1 page.

Hal R. Varian, "Buying, renting, and sharing information goods," Technical report, School of Information Management and Systems, UC Berkeley, Dec. 1994; 20 pages.

Hal R. Varian, "Circulating Libraries and Video Rental Stores," Dec. 1996, retrieved from http://web.archive.org; pp. 1-14.

Hal R. Varian, et al., "Circulating Libraries and Video Rental Stores," University of Michigan, Dearborn, University of California, Berkeley, http://www.sims.berkeley.edu/~hal/

Papers/history/history.html, Mar. 2000; pp. 1-13.

Griest, Guinevere L.: Mudie's Circulating Library and the Victorian Novel. Bloomington and London, Indiana, Univ. Press, 1970, 282 pages.

*Books by Mail, a handbook for libraries* (1977) by Choong H. Kim. In the Quebec section at p. 394, the *McLennan Traveling Libraries of McGill University* were reviewed, 2 pages.

James Lardner, *Fast Forward: Hollywood, the Japanese and the Onslaught of the VCR* by, Chapter 12 Wilbur & Orville & Tom, Dick, & Harry and Chapter 13 The Rental Wars, pp. 168-202 (1987).

Abigail A. Loomis, "Subscription libraries," in Wayne A. Wiegand and Jr. Donald G. Davis, editors, Encyclopedia of Library History, pp. 608-610. Garland Publishing, Inc., New York & London, 1994.

Glenn Miller *Customer Service & Innovation in Libraries* pp. 73-90, Highsmith Press 1996. ("Book").

* cited by examiner

APPROACH FOR RENTING ITEMS TO CUSTOMERS

RELATED APPLICATION AND PRIORITY INFORMATION

This application is a continuation of and claims benefit of U.S. Non Provisional application entitled "Method and Apparatus for Renting Items", Ser. No. 09/561,041, filed Apr. 28, 2000 now U.S. Pat. No. 6,584,450. The entire contents of this prior application are hereby incorporated by reference in its entirety for all purposes.

FIELD OF THE INVENTION

The present invention relates to inventory rental, and more specifically, to an approach for renting movies to customers.

BACKGROUND OF THE INVENTION

Conventional inventory rental models are typically based upon renting items for fixed rental periods and charging late fees for keeping rented items beyond a specified return date. These types of inventory models suffer from several significant limitations. First, conventional rental models require customers to make the decision of what items to rent at substantially the same time as the decision of when to rent the items. An example that illustrates this limitation is a video rental business. Customers go to a video rental store and select particular movies to rent at that time. The customers take the movies home and must return them by a particular due date or be charged a late fee. In this situation, the customers cannot decide what movies to rent before actually renting them. The customers may have a particular movie in mind, but there is no guarantee that the video rental store has the particular movie in stock. Moreover, due dates are inconvenient for customers, particularly for "new release" movies that are generally due back the next day.

Given the current demand for inventory rental and the limitations in the prior approaches, an approach for renting items to customers that does not suffer from limitations associated with conventional inventory rental models is highly desirable. In particular, an approach for renting inventory items to customers that allows separation of customers' decisions of what items to rent from when to rent the items is highly desirable.

There is a further need for an approach for renting items to customers on a continuous basis that avoids the use of fixed due dates or rental "windows" appurtenant to conventional rental models.

There is yet a further need for an approach for renting movies, games and music to customers that is more convenient and flexible to customers than conventional approaches.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects and features of example embodiments of the invention are described in more detail hereinafter in the following sections: (1) functional overview; (2) item selection criteria; (3) item delivery; (4) "Max Out"; (5) "Max Turns"; (6) inventory management; and (7) implementation mechanisms.

1. Functional Overview

Figure 1:
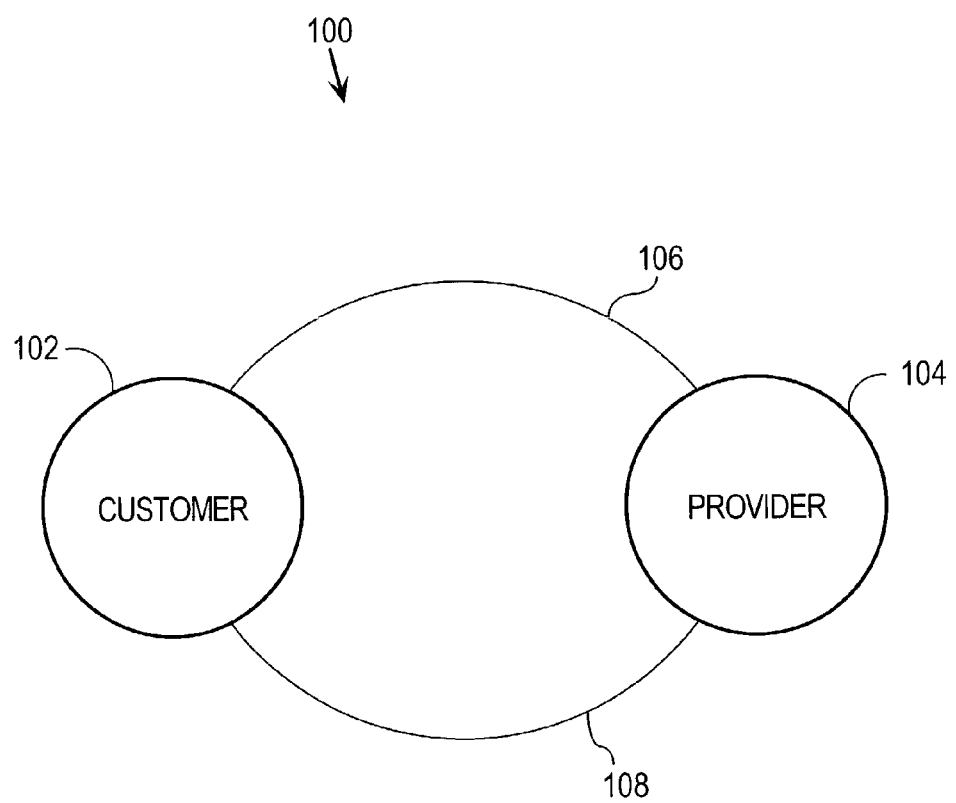
FIG. 1 is a diagram depicting an approach for renting items to customers according to an embodiment.

FIG. 1 is a block diagram 100 that illustrates an approach for renting items to customers according to various embodiments described herein. As used herein, the term "items" refers to any commercial goods that can be rented to customers. Examples of items include movies, music and games stored on a non-volatile memory such as a tape, other magnetic medium, optical medium, read-only memory or the like, and the invention is not limited to any particular type of item. In general, the decision of what items to rent is separated from the decision of when to rent the items. Customers may specify what items to rent using one or more item selection criteria separate from deciding when to receive the specified items. Furthermore, customers are not constrained by conventional rental "windows" and instead can have continuous, serialized rental of items.

According to one embodiment, a customer 102 provides one or more item selection criteria to a provider 104 over a link 106. Link 106 may be any medium for transferring data between customer 102 and provider 104 and the invention is not limited to any particular medium. Examples of link 106 include, without limitation, a network such as a LAN, WAN or the Internet, a telecommunications link, a wire or optical link or a wireless connection.

The item selection criteria indicate items that customer 102 desires to rent from provider 104. In response to receiving the item selection criteria from customer 102, provider 104 provides the items indicated by the item selection criteria to customer 102 over a delivery channel 108. Delivery channel 108 may be implemented by any mechanism or medium that provides for the transfer of items from provider 104 to customer 102 and the invention is not limited to any particular type of delivery channel. Examples of delivery channel 108 include, without limitation, mail delivery, courier delivery or delivery using a delivery agent.

Provider 104 may be centralized or distributed depending upon the requirements of a particular application.

According to an embodiment, a "Max Out" approach allows up to a specified number of items to be rented simultaneously to customer 102 by provider 104. According to another embodiment, a "Max Turns" approach allows up to a specified number of item exchanges to occur during a specified period of time. The "Max Out" and "Max Turns" approaches may be used together or separately with a variety of subscription methodologies.

Figure 2:
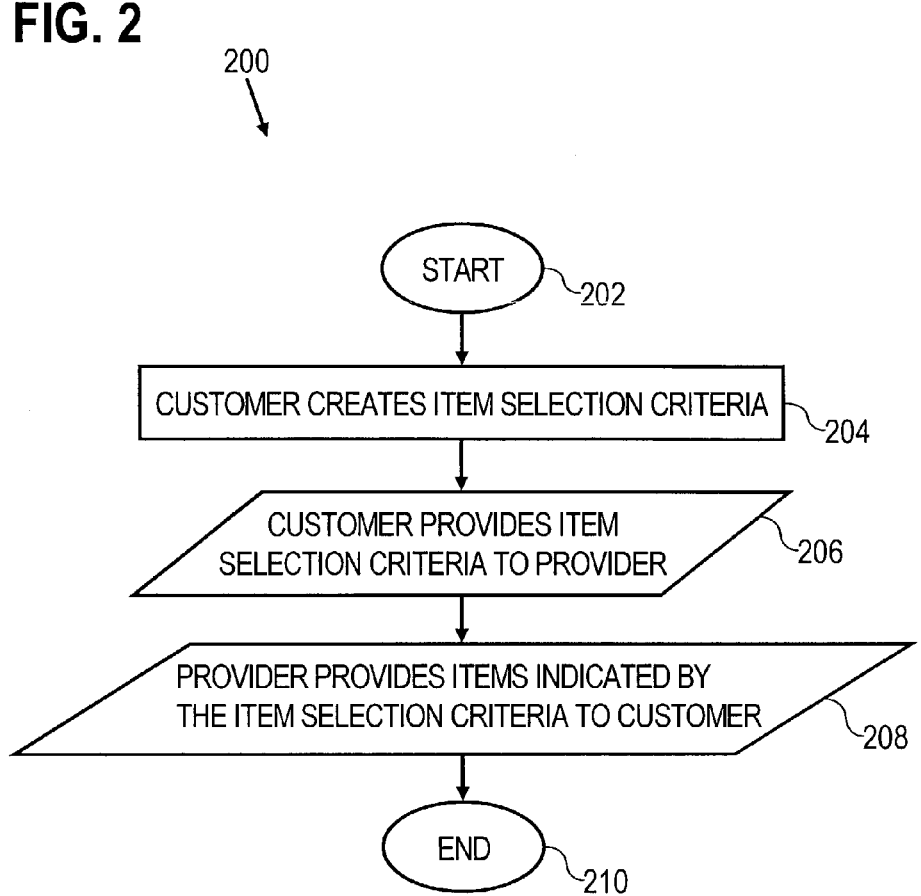
FIG. 2 is a flow diagram depicting an approach for renting items to customers according to an embodiment.

The approach just described for renting items to customers is now described with reference to a flow diagram 200 of FIG. 2. After starting in step 202, in step 204, customer 102 creates item selection criteria. In step 206, customer 102 provides the item selection criteria to provider 104. In step 208, in response to provider 104 receiving the item selection criteria from customer 102, provider 104 provides one or more items indicated by the item selection criteria to customer 102. The process is complete in step 210.

2. Item Selection Criteria

The one or more item selection criteria provided by customer 102 to provider 104 indicate the particular items that customer 102 desires to rent from provider 104. Thus, the item selection criteria define a customer-specific order queue that is fulfilled by provider 104. According to one embodiment, the item selection criteria specify attributes of items to be provided by provider 104 to customer 102. Item selection criteria may specify any type of item attributes and the invention is not limited to particular item attributes. Examples of item attributes include, without limitation, identifier attributes, type attributes and cost attributes. Item selection criteria may be changed at any time to reflect changes in items that customers desire to rent from a provider.

3. Item Delivery

According to one embodiment, items are delivered by provider 104 to customer 102 over delivery channel 108 based upon item delivery criteria. More specifically, the delivery of items from provider 104 to customer 102 is triggered by item delivery criteria being satisfied. The item delivery criteria may include a wide range of criteria and the invention is not limited to any particular item delivery criteria. Examples of item delivery criteria include, without limitation, customer request/notification, customer notification that an item is being returned, customer return of an item, the occurrence of a specified date, the elapsing of a specified period of time or a customer payment.

The item delivery criteria may be specified by customer 102 to provider 104 or negotiated by customer 102 and provider 104 as part of a subscription service. For example, a particular subscription service may include item delivery criteria that specifies that a particular number of items are to be delivered monthly. As another example, item delivery criteria may specify that an initial set of items is to be delivered by provider 104 to customer 102 upon initiation of a subscription service and that additional items are to be delivered to customer 102 upon return of items to provider 104. Item delivery criteria may be applied uniformly to all items to be delivered to a customer, or may be item specific. For example, item delivery criteria may specify a particular date, i.e., the third Wednesday of every month, for all item deliveries. Alternatively, separate item delivery dates may be assigned to each item.

4. "Max Out"

According to one embodiment, a "Max Out" approach is used to manage the number of items that may be simultaneously rented to customers. According to the "Max Out" approach, up to a specified number of items may be rented simultaneously to a customer. Thus, the "Max Out" approach establishes the size of an inventory of items that may be maintained by customers. The specified number of items may be specific to each customer or may be common to one or more customers. In the present example, if the specified number of items is three, then up to three items may be rented simultaneously by provider 104 to customer 102. If the specified number of items are currently rented to customer 102 and the specified item delivery criteria triggers the delivery of one or more additional items, then those items are not delivered until one or more items are returned by customer 102 to provider 104.

According to one embodiment, in situations where the specified number of items are currently rented to customer 102 and the specified item delivery criteria triggers the delivery of one or more additional items, then the one or more additional items are delivered to customer 102 and customer 102 and a surcharge is applied customer 102. The specified number of items may then be increased thereafter to reflect the additional items delivered to customer 102 and increase the size of the inventory maintained by customer 102. Alternatively, the specified number of items may remain the same and number of items maintained by customer 102 returned to the prior level after items are returned to provider 104 by customer 102. When used in conjunction with the "Max Turns" approach described hereinafter, the specified number of items may be unlimited.

Figure 3:
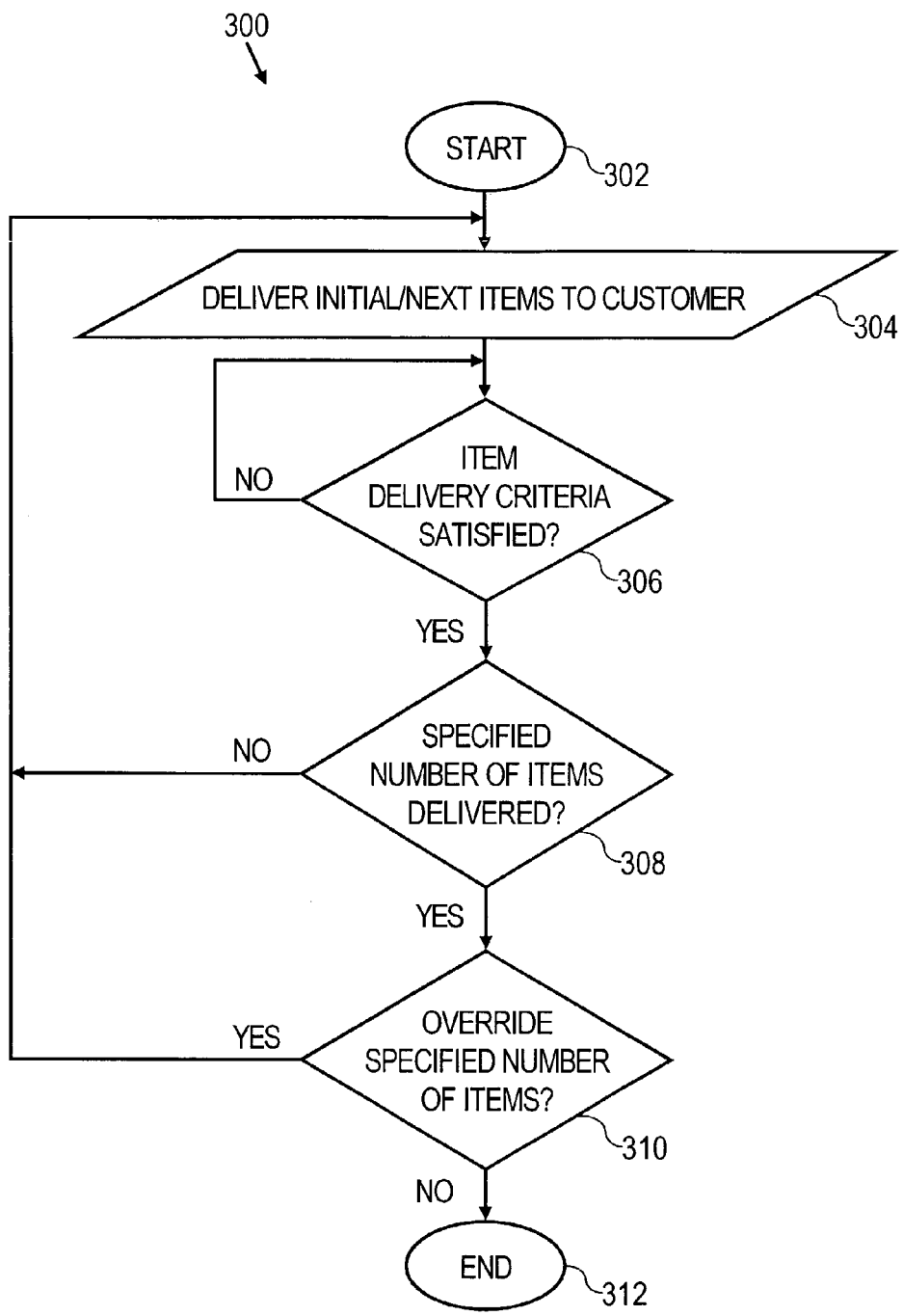
FIG. 3 is a flow diagram depicting a "Max Out" approach for renting items to customers according to an embodiment.

The "Max Out" approach for managing the number of items that may be simultaneously rented to customers is now described with reference to a flow diagram 300 of FIG. 3. After starting in step 302, in step 304, one or more initial items are delivered to customer 102 to establish the inventory maintained by customer 102. Note that an initial delivery of items is not required and according to one embodiment, the inventory of customer 102 is incrementally established over time.

In step 306, a determination is made whether the item delivery criteria have been satisfied. If not, then the determination continues to be made until the item delivery criteria are satisfied. As described previously herein, the delivery criteria may include customer notification generally, customer notification that an item is being returned, actual return of an item, the occurrence of a specific date, or that a specified amount of time has elapsed.

Once the item delivery criteria are satisfied, then in step 308, a determination is made whether the specified number of items have been delivered. If not, then control returns to step 304 and one or more additional items are delivered by provider 104 to customer 102. If however, in step 308, the specified number of items have been delivered, then in step 310, a determination is made whether the specified number of items, i.e., the "Max Out" limit, is to be overridden. As previously described, the specified number of items may be overridden by increasing the specified number of items, i.e., the "Max Out" limit, to allow additional items to be delivered to customer 102 and charging a fee to customer 102. Alternatively, the specified number of items is not changed and a surcharge applied to customer 102. This process continues for the duration of the subscription and is then complete in step 312.

5. "Max Turns"

According to one embodiment, a "Max Turns" approach is used to rent items to customers. According to the "Max Turns" approach, up to a specified number of item exchanges may be performed during a specified period of time. For example, referring to FIG. 1, suppose that provider 104 agrees to rent items to customer 102 with a "Max Turns" limit of three items per month. This means that customer 102 may make up to three item exchanges per month. This approach may be implemented independent of the number of items that a customer may have rented at any given time under the "Max Out" approach. The approach is also independent of the particular item delivery criteria used.

According to one embodiment, the "Max Turns" approach is implemented in combination with the "Max Out" approach to rent items to customers. In this situation, up to a specified number of total items are simultaneously rented to customer 102 and up to a specified number of item exchanges may be made during a specified period of time. Thus, using the "Max Out" and the "Max Turns" approaches together essentially establishes a personal item inventory for customer 102 based upon the "Max Out" limit that may be periodically refreshed based upon the "Max Turns" limit selected.

In some situations, customer 102 may wish to exchange more than the specified number of items during a specified period. According to one embodiment, in this situation, provider 104 agrees to rent additional items above the specified number to customer 102 and to charge customer 102 for the additional items. For example, suppose that provider 104 agrees to rent items to customer 102 with up to three item turns (exchanges) per month. If, in a particular month, customer 102 requires two additional turns, then the two additional items are provided to customer 102 and a surcharge is applied to customer 102 for the additional two items.

In other situations, customer 102 may not use all of its allotted turns during a specified period. According to one embodiment, customers lose unused turns during a subscription period. For example, if customer 102 has a "Max Turns" limit of four item exchanges per month and only makes two item exchanges in a particular month, then the two unused exchanges are lost and cannot be used. At the start of the next month, customer 102 would be entitled to four new item exchanges.

According to another embodiment, customers are allowed to carry over unused turns to subsequent subscription periods. For example, if customer 102 has a "Max Turns" limit of four item exchanges per month and only makes two item exchanges in a particular month, then the two unused exchanges are lost and cannot be used. At the start of the next month, customer 102 would be entitled to six new item exchanges, two from the prior month and four for the current month.

Figure 4:
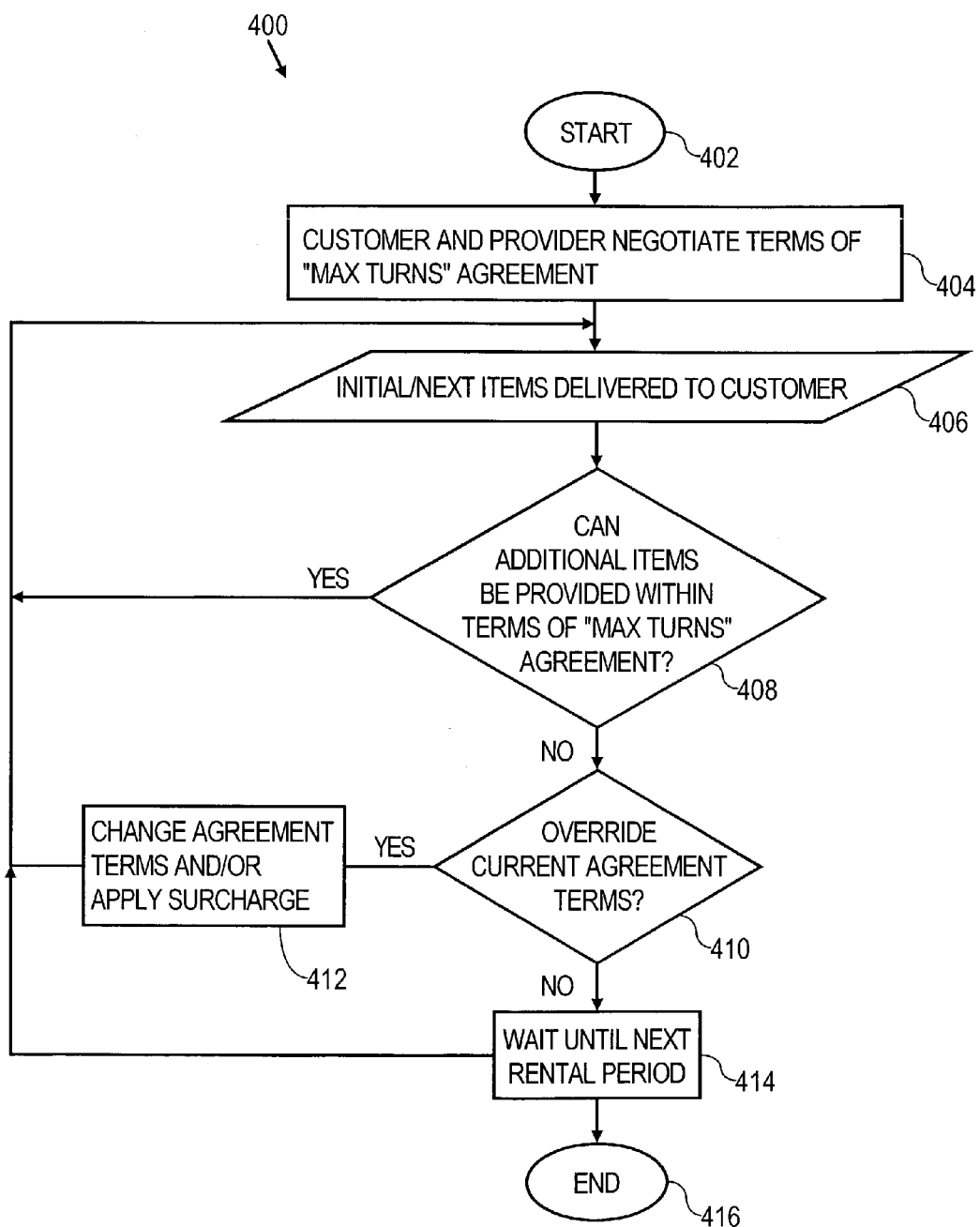
FIG. 4 is a flow diagram depicting a "Max Turns" approach for renting items to customers according to an embodiment.

The "Max Turns" approach for renting items to customers is now described with reference to a flow diagram 400 of FIG. 4. After starting in step 402, in step 404, customer 102 and provider 104 agree upon the terms of the "Max Turns" agreement. Specifically, customer 102 and provider 104 agree at least upon the maximum number of turns that are allowed in a specified period of time.

In step 406, in response to one or more item delivery criteria being satisfied, provider 104 provides one or more items to customer 102 over delivery channel 108. Any type of item delivery criteria may be used with the "Max Turns" approach and the invention is not limited to any particular delivery criteria. For example, the initial one or more items may be delivered to customer 102 in response to a subscription payment made by customer 102 to provider 104, the initiation of a specified subscription period, or by request of customer 102 for the initial rental items. The number of initial one or more items must not exceed the terms of the "Max Turns" agreement.

In step 408, in response to one or more delivery criteria being satisfied, a determination is made whether additional items can be provided to customer 102 within the terms of the "Max Turns" agreement. For example, if the number of items rented to customer in the current subscription period is less than the agreed-upon "Max Turns," then additional items can be rented to customer 102 within the terms of the "Max Turns" agreement. In this situation, this determination may be made in response to customer 102 returning one or more items to provider 104, or by customer 102 requesting additional items.

If, in step 408, a determination is made that additional items can be rented to customer 102 within the terms of the "Max Turns" agreement, then control returns to step 406 where one or more additional items are rented to customer 102. If however, in step 408, a determination is made that additional items cannot be rented to customer 102 within the terms of the "Max Turns" agreement, then in step 410, a determination is made whether to override the current agreement terms. If so, then in step 412, the agreement terms are changed to allow for a larger number of terms and customer 102 is charged accordingly, or the terms are left unchanged and a surcharge is applied for the additional items to be delivered. Control then returns to step 406, where one or more additional items are delivered to customer 102.

If in step 410, a determination is made that the current agreement is not to be overridden, then in step 414, no items are delivered to customer 102 until the next subscription period. For example, the request for additional items may be received at the end of a subscription period and instead of renting the additional items immediately, they are instead delivered during the subsequent subscription period. Control then returns to step 406 where one or more additional items are rented to customer or the process is complete in step 416.

Figure 5:
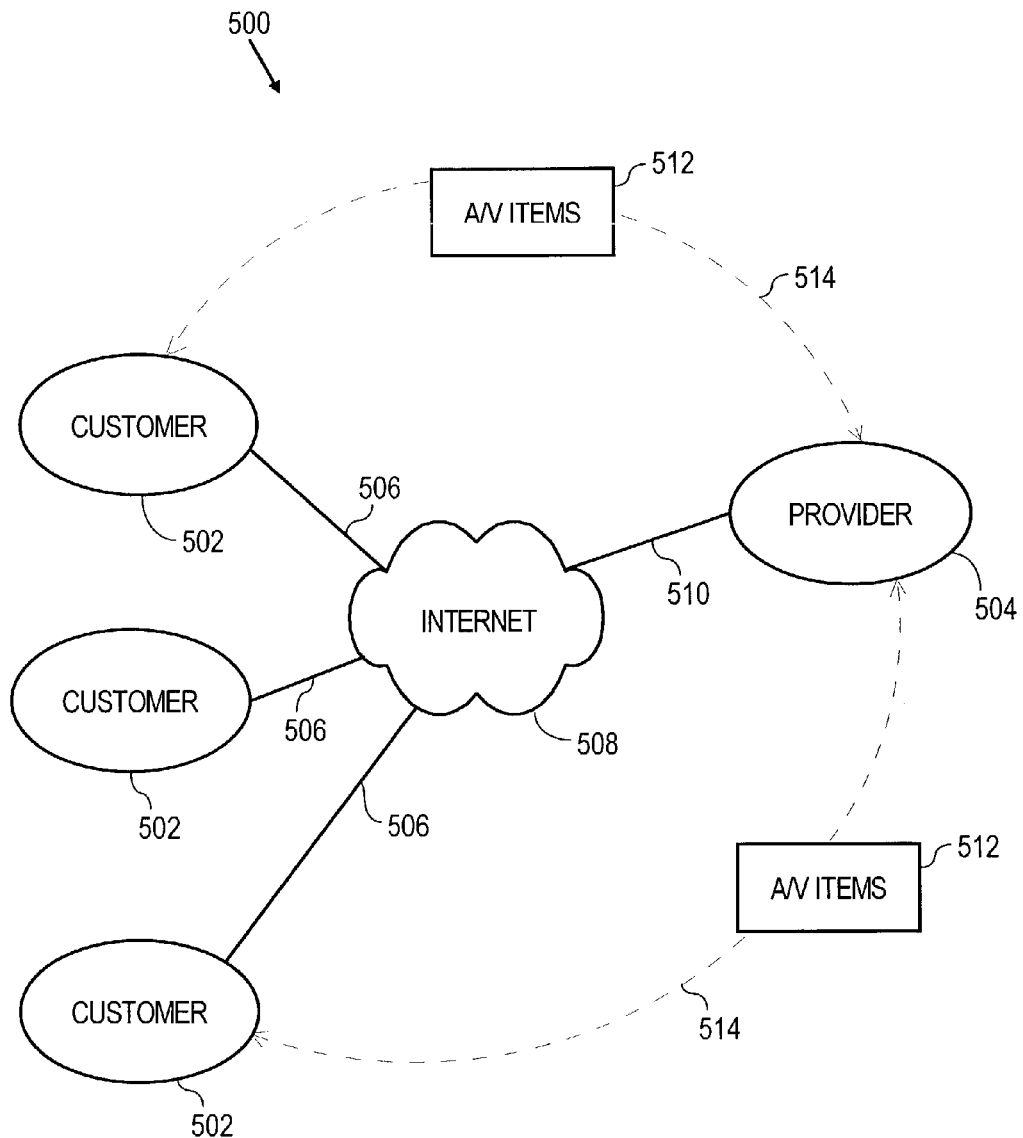
FIG. 5 is a diagram depicting an approach for renting audio/video items to customers over the Internet according to an embodiment.

The approach for renting items described herein is now described in the context of renting to customers audio/video (A/V) items, such as movies, games and music, stored on various media. FIG. 5 is a diagram 500 that depicts a set of customers 502 that desire to A/V items from a provider 504. Customers 502 communicate with provider 504 over links 506, the global packet-switched network referred to as the "Internet," and a link 510.

Links 506 and 510 may be any medium for transferring data between customers 502 and the Internet 508 and between the Internet 508 and provider 504, respectively, and the invention is not limited to any particular medium. In the present example, links 506 and 510 may be connections provided by one or more Internet Service Providers (ISPs) and customers 502 are configured with generic Internet web browsers. Links 506 and 510 may be secure or unsecured depending upon the requirements of a particular application.

In accordance with an embodiment, customers 502 enter into a rental agreement with provider 504 to rent audio/video (A/V) items 512 from provider 504 according to the "Max Out" and/or "Max Turns" approaches described herein. The invention is not limited to any particular approach for entering into the rental agreement. For example, customers 502 and provider 504 may enter into a rental agreement by mail, telephone or over the Internet, by customers 502 logging into a web site associated with provider 504.

Customers 502 create and provide item selection criteria to provider 504 over links 506 and 510 and the Internet 508.

The invention is not limited to any particular approach for specifying and providing item selection criteria to provider 504. For example, according to one embodiment, customers 502 provide item selection criteria to provider 504 in one or more data files. According to another embodiment, customers 502 log onto a web site of provider 504 and use a graphical user interfaced (GUI) to specify attributes of the movies and music that customers desire to rent from provider 504.

The item selection attributes may include any attributes that describe, at least in part, movies, games or music that customers 502 desire to rent. For movies, example attributes include, without limitation, title, category, director name, actor name and year of release. For games, example attributes include, without limitation, title and category. For music, example attributes include, without limitation, title, category, artist/group name and year of release. Customers 502 may identify specific movies or music by the item selection criteria, or may provide various attributes and allow provider 504 to automatically select particular movies and music that satisfy the attributes specified. For example, customers 502 may specify item selection criteria that include horror movies released in 1999 and let provider 504 automatically select horror movies that were release in 1999. As another example, customers 502 may specify item selection criteria that include adventure movies starring Harrison Ford. Customers 502 may also specify an order or priority for the specified item selection criteria. For example, customers 502 may specify specific movie titles and the order in which they want to receive them. As another example, customers 502 may specify that they want to receive a particular number of movies of different types.

Once customers 502 and provider 504 have entered into a rental agreement and customers 502 have provided item selection criteria to provider 504, then A/V items 512 are rented to customers 502 over delivery channels 514 in accordance with the terms of the rental agreement. Specifically, according to the "Max Out" approach described herein, an initial set of A/V items 512, such as movies, games and music, are delivered to customers 502 over delivery channels 514 according to the terms of the rental agreement. Subsequent A/V items 512 are delivered whenever the specified item delivery criteria are satisfied. For example, additional A/V items 512 may be delivered upon the return of one or more A/V items 512 to provider, a request from customers 502, the arrival of a particular date, e.g., a specific day of the month, or the expiration of a specified period of time, e.g., fifteen days.

In accordance with the "Max Out" approach described herein, once the maximum number of A/V items 512 have been rented to a particular customer 502, then no additional A/V items 512 are rented until one or more rented A/V items 512 are returned to provider 504, or unless a surcharge is applied to the particular customer 502. Alternatively, the rental agreement between the particular customer 502 and provider 504 may be modified to increase the maximum number of A/V items 512 that may be rented simultaneously to the particular customer 502.

The rental agreement between customers 502 and provider 504 may also specify a maximum number of turns in combination with the "Max Turns" approach. In this situation, a maximum number of turns restricts how quickly customers 502 may refresh their A/V item 512 inventories. For example, suppose that a particular customer 502 agrees with provider 504 to rent up to four movies with a maximum of four turns per month. Under this agreement, the particular customer 502 may maintain a personal inventory of up to four movies and rent four new movies per month. Thus, the particular customer 502 can completely "replace" his personal inventory once per month. If the particular customer 502 agreed to a maximum of up to eight turns per month, then the particular customer 502 would be able to completely replace his personal inventory twice per month.

Provider 504 is illustrated as a single entity for purposes of explanation only. Provider 504 may be centralized or distributed depending upon the requirements of a particular application. For example, provider 504 may be a central warehouse from which all A/V items 512 are provided. Alternatively, provider 504 may be implemented by a network of distributed warehouses.

Figure 6:
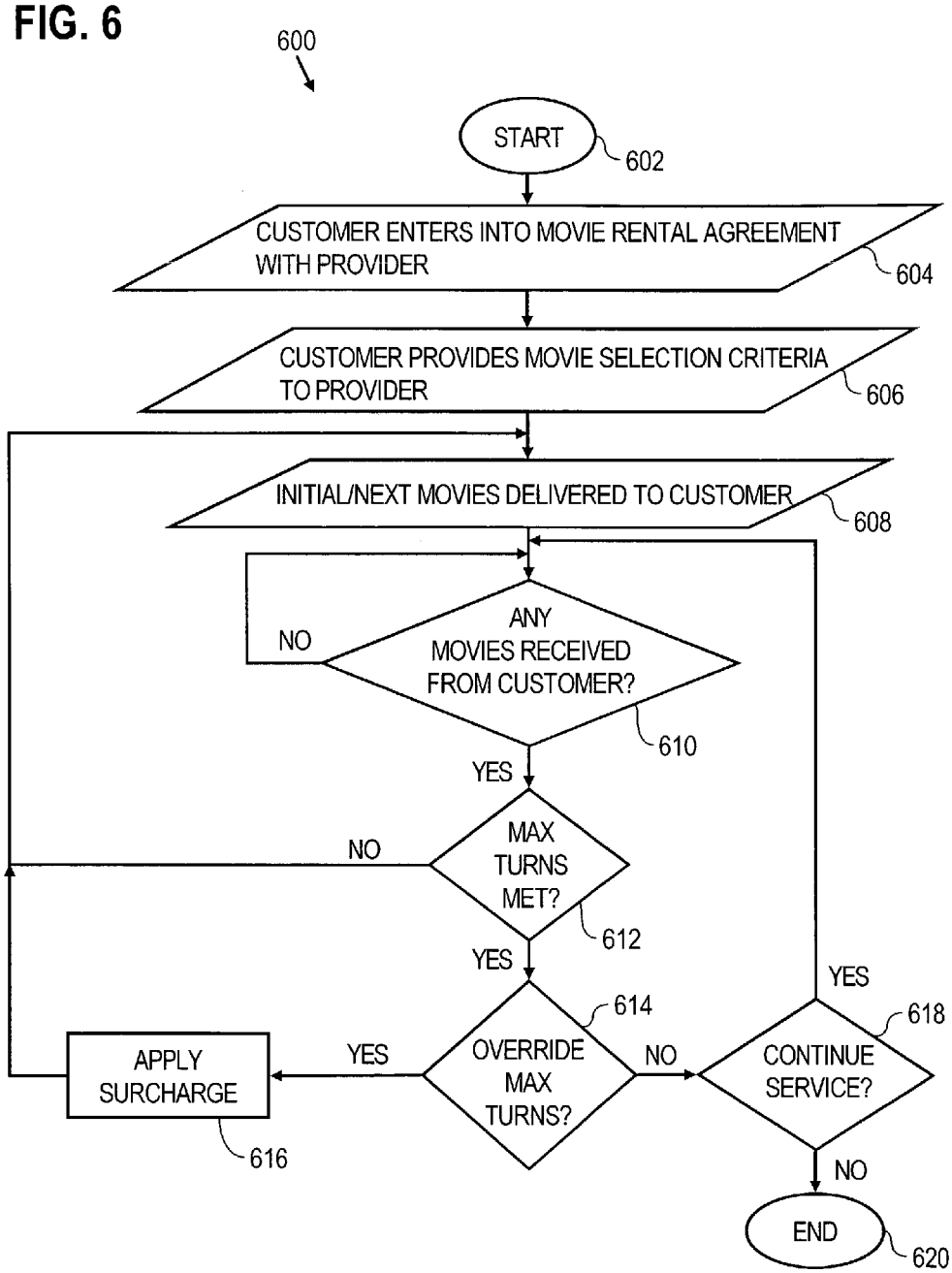
FIG. 6 is a flow diagram illustrating an approach for renting audio/video items to customers over the Internet using both "Max Out" and "Max Turns" according to an embodiment.

FIG. 6 is a flow diagram that illustrates an approach for renting A/V items 512, e.g., movies, to customers over a communications network such as the Internet using both "Max Out" and "Max Turns" according to an embodiment. Referring also to FIG. 5, after starting in step 602, in step 604, a customer 502 enters into a rental agreement with provider 504. In the present example, customer 502 uses a generic web browser to access an Internet web site associated with provider 504 and enter into a rental agreement that specifies that customer 502 may maintain a personal inventory of four movies ("Max Out" of four) and receive up to four new movies per month ("Max Turns" of four). Furthermore, the rental agreement specifies that new movies will be delivered upon return of a rented movie from customer 502, i.e., the delivery criteria is a return of a movie by the customer.

In step 606, customer 502 creates and provides movie selection criteria to provider 504 that indicates movies that customer 502 desires to rent. For example, the movie selection criteria may specify particular movie titles that customer 502 desires to rent. The movie selection criteria may also specify an order or priority in which customer 502 wishes to rent the movies. Instead of identifying particular movie titles, the movie selection criteria may specify movie preferences for customer 502, e.g., types of movies, directors, actors, or any other movie preferences or attributes. In this situation, provider 504 automatically selects particular titles that satisfy the movie selection criteria. For example, the movie selection criteria may specify a preference for action movies starring a particular actor, with a preference for "new release" movies. Provider 504 attempt to provide movies to customer 502 that best satisfy the preferences indicated by the movie selection criteria.

In step 608, one or more initial movies 512 are delivered to customer 502 over delivery channel 514. The one or more initial movies 512 may be delivered to customer 502 via mail, courier, delivery agent or any other suitable means negotiated between customer 502 and provider and the invention is not limited to any particular type of delivery mechanism. For purposes of explanation only, is presumed in the present example that movies are mailed between customer 502 and provider 504.

The one or more initial movies 512 establish the personal movie inventory of customer 502. Customer 502 may choose to receive any number of movies up to the "Max Out" limit of four movies. Typically, customer 502 will choose to initially receive four movies in the initial delivery.

Once the one or more initial movies 512 have been mailed to customer 502, then in step 610, a determination is made whether any movies 512 have been returned by customer 502 to trigger another movie delivery. In the present example, the delivery of additional movies is triggered by the receipt, e.g., via mail, of one or more movies from customer 502. In the situation where customer 502 elects to not receive the maximum number of movies 512 in the initial delivery, then the delivery of additional movies 512 may also be triggered by a request from customer 502 for additional movies 512. For example, customer 502 may notify provider 504 via telephone, email or by accessing the web site associated with provider 504.

If, in step 610, a determination is made that one or more movies 512 were received from customer 502, then in step 612, a determination is made whether the maximum number of turns ("Max Turns") limit has been reached for the current cycle. In the present example, a determination is made whether four or more movies have been mailed in the current month. If not, then control returns to step 608, where one or more additional movies 512 are mailed to customer 502 via delivery channel 514 up to the "Max Out" limit of four.

If, in step 612, a determination is made that the "Max Turns" limit has been met for the current cycle, i.e., in the present example, four movies 512 have been mailed to customer 502 in the current month, then in step 614 a determination is made whether to override the current "Max Turns" limit. If so, then in step 616, a surcharge is applied to customer 502 and control returns to step 608 where the additional movies 514 are mailed to customer 502. If not, then in step 618, a determination is made whether to continue the subscription service. If so, then no additional movies are mailed to customer 502 during the current cycle, e.g., the current month, and the control returns to step 610. If, in step 618, a determination is made that service is not to be continued, then the process is complete in step 620.

In some situations, customer 502 may desire to increase or decrease the size of customer's 502 personal movie inventory by changing the current "Max Out" limit. According to one embodiment, customer 502 notifies provider 504, e.g., by telephone, mail, email or by accessing the web site associated with provider 504, that customer 502 wishes to change the "Max Out" limit. The movie rental agreement between customer 502 and provider 504 is then modified to reflect the change of the "Max Out" limit. In the situation where the "Max Out" limit is increased, then additional movies 512 may be immediately mailed to customer 502.

6. Inventory Management

The approach described herein for renting items to customers provides superior inventory management to prior approaches. Specifically, the use of item selection criteria provides for efficient inventory management by allowing the greatest number of items to be rented at any given time. Moreover, the greatest number of customers are provided with their most preferred items. For example, customers may specify priorities for the items indicated by the item selection criteria. Thus, if a particular customer's first choice is not available, or already rented, then the item having the next highest priority can be rented to the particular customer. According to one embodiment, customers may indicate items that are not yet available for rent. Then, the items are delivered to customers when they become available.

For example, referring again to FIG. 5, suppose that a particular customer 502 desires to rent an as-yet-unreleased movie entitled "ABC." The particular customer 502 indicates this movie to provider 504 by the item selection criteria. Since the movie ABC is not yet available, it cannot be delivered to the particular customer 502. However, when the movie ABC does become available, it can be shipped immediately to the particular customer 502, as well as other customers 502 who may have also requested the movie. This allows provider 504 to maximize the number of items rented while ensuring that customers 502 are able to rent the highest priority items that they requested.

According to another embodiment, as yet unknown items may also be rented by specifying attributes of the unknown items. For example, the particular customer 502 may request to rent the next new movie of a particular director, for which the exact name is unknown to the particular customer. As another example, the particular customer 502 may request to rent the next album of a particular group that is currently in process and does not yet have a title.

7. Implementation Mechanisms

The approach described herein for renting items to customers is applicable to any type of rental application and (without limitation) is particularly well suited for Internet-based rental applications for renting movies and music to customers. The invention may be implemented in hardware circuitry, in computer software, or a combination of hardware circuitry and computer software and is not limited to a particular hardware or software implementation.

Figure 7:
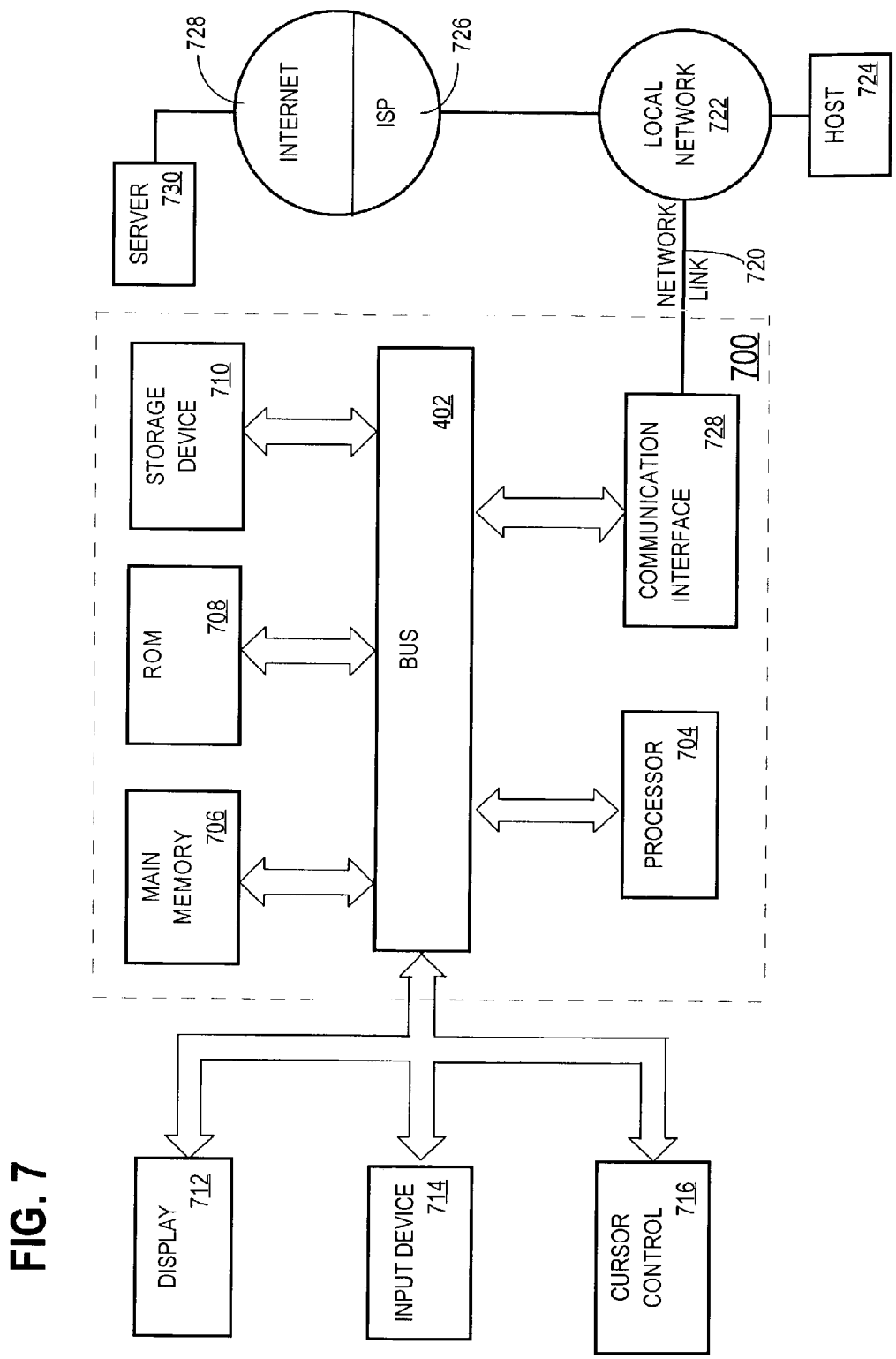
FIG. 7 is a block diagram of a computer system upon which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for renting items to customers. According to one embodiment of the invention, the renting of items to customers is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for the renting of items to customers as described herein.

The received code may be executed by processor 704 as it is received, and/or stored in storage device 710, or other non-volatile storage for later execution. In this manner, computer system 700 may obtain application code in the form of a carrier wave.

The novel approach described herein for renting items to customers provides several advantages over prior approaches for renting items to customers. First, the decision of what items to rent may be separated from the decision of when to rent the items. Customers may specify what items to rent using the item selection criteria and receive the items at a future point in time, without having to go to the provider to pick up the items. The selection criteria may be user specific and may indicate a desired fulfillment sequence. Furthermore, customers are not constrained by conventional due dates and instead may establish continuous, serialized rental streams of items. The approach also allows more efficient inventory management.

The "Max Out" approach for inventory management allows users to maintain their own inventory of items that are periodically replaced by other items according to specified event criteria. The event criteria that trigger sending another item to a customer are very flexible and may be tailored to the requirements of a particular application. For example, as described herein, the event criteria may include a return of any of the items currently in use by the customer or merely customer notification. This is very convenient in the context of movie rentals since a the return of a movie to the provider automatically triggers the sending of another movie to the customer. The "Max Turns" approach for inventory management, when used alone or in combination with "Max Out," provides even greater flexibility for customers and providers. The max number of turns can be selected individually for particular customers depending upon their particular needs.

The "Max Out" and "Max Turns" approaches provide great flexibility in establishing subscription models to satisfy the needs of a particular application. Specifically, the size and replacement frequency of customer inventories can be tailored to each customer with individualized subscription plans.

In the foregoing specification, the invention has been described as applicable to an implementation anticipating Internet based ordering and mail or other long-distance delivery of the items, where the special advantages of the method are very attractive. However the same invention may be applied in a more conventional video, games, or music rental-store setting, where subscription customers may be allowed rentals of a specified number of movies, games, or music selections at any time, and/or in one subscription period, without rental return due dates, in exchange for a periodic rental subscription fee.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

The invention claimed is:

1. A computer-implemented method for renting movies to customers, the method comprising:
   providing electronic digital information that causes one or more attributes of movies to be displayed;
   establishing, in electronic digital form, from electronic digital information received over the Internet, a movie rental queue associated with a customer comprising an ordered list indicating two or more movies for renting to the customer;
   causing to be delivered to the customer up to a specified number of movies based upon the order of the list;
   in response to one or more delivery criteria being satisfied, selecting another movie based upon the order of the list and causing the selected movie to be delivered to the customer; and
   in response to other electronic digital information received from the customer over the Internet, electronically updating the movie rental queue.

2. A computer-implemented method as recited in claim 1, wherein updating the movie rental queue comprises changing the order of the two or more movies for renting to the customer.

3. A computer-implemented method as recited in claim 1, wherein updating the movie rental queue comprises indicating an additional movie in the ordered list.

4. A computer-implemented method as recited in claim 1, wherein updating the movie rental queue comprises removing an indication of one or more of the movies from the ordered list.

5. A computer-implemented method as recited in claim 1, wherein the two or more movies for renting to the customer are selected by the customer.

6. A computer-implemented method as recited in claim 1, further comprising determining the order of the two or more movies based upon one or more preferences of the customer.

7. A computer-implemented method as recited in claim 1, wherein the delivery of the selected movie comprises delivery by mail.

8. A computer-implemented method as recited in claim 1, wherein the delivery of the selected movie comprises delivery by mail on one or more optical media.

9. A computer-implemented method as recited in claim 1, wherein the delivery criteria comprises receipt of the movie by mail.

10. A computer-implemented method as recited in claim 1, wherein a number of movies delivered to the customer and not yet returned does not exceed the specified number.

11. A method as recited in claim 1, wherein the other electronic digital information indicates one or more delivery criteria being satisfied.

12. A method as recited in claim 1, wherein the other electronic digital information comprises one or more selection criteria.

13. A method as recited in claim 1, wherein the movies comprise any of motion pictures, television series, documentaries, cartoons, music videos, video recordings of concert performances, instructional programs, and educational programs.

14. A computer-implemented method for renting movies to customers, the method comprising:
   providing electronic digital information that causes one or more attributes of movies to be displayed;
   establishing, in electronic digital form, from electronic digital information received over the Internet, a movie rental queue associated with a customer comprising an ordered list indicating two or more movies for renting to the customer;
   causing to be delivered to the customer up to a specified number of movies based upon the order of the list, wherein the customer is not required to return the movies within a specified time associated with delivery;
   in response to one or more delivery criteria being satisfied, selecting another movie based upon the order of the list and causing the selected movie to be delivered to the customer; and
   in response to other electronic digital information received from the customer over the Internet, electronically updating the movie rental queue.

15. A computer-implemented method as recited in claim 14, wherein updating the movie rental queue comprises changing the order of the two or more movies for renting to the customer.

16. A computer-implemented method as recited in claim 14, wherein updating the movie rental queue comprises indicating an additional movie in the ordered list.

17. A computer-implemented method as recited in claim 14, wherein updating the movie rental queue comprises removing an indication of one or more of the movies from the ordered list.

18. A computer-implemented method as recited in claim 14, wherein the two or more movies for renting to the customer are selected by the customer.

19. A computer-implemented method as recited in claim 14, further comprising determining the order of the two or more movies based upon one or more preferences of the customer.

20. A computer-implemented method as recited in claim 14, wherein the delivery of the selected movie comprises delivery by mail.

21. A computer-implemented method as recited in claim 14, wherein the delivery of the selected movie comprises delivery by mail on one or more optical media.

22. A computer-implemented method as recited in claim 14, wherein the delivery criteria comprises receipt of the movie by mail.

23. A computer-implemented method as recited in claim 14, wherein a number of movies delivered to the customer and not yet returned does not exceed the specified number.

24. A computer-implemented method for renting movies to customers, the method comprising:
   providing electronic digital information that causes one or more attributes of movies to be displayed;
   establishing, in electronic digital form, from electronic digital information received over the Internet, a movie rental queue associated with a customer comprising an ordered list indicating two or more movies for renting to the customer;
   causing to be delivered to the customer up to a specified number of movies based upon the order of the list, wherein the customer is not charged a fee for retaining one or more movies beyond a specified time associated with delivery;
   in response to one or more delivery criteria being satisfied, selecting another movie based upon the order of the list and causing the selected movie to be delivered to the customer; and in response to other electronic digital information received from the customer over the Internet, electronically updating the movie rental queue.

25. A computer-implemented method as recited in claim 24, wherein updating the movie rental queue comprises changing the order of the two or more movies for renting to the customer.

26. A computer-implemented method as recited in claim 24, wherein updating the movie rental queue comprises indicating an additional movie in the ordered list.

27. A computer-implemented method as recited in claim 24, wherein updating the movie rental queue comprises removing an indication of one or more of the movies from the ordered list.

28. A computer-implemented method as recited in claim 24, wherein the two or more movies for renting to the customer are selected by the customer.

29. A computer-implemented method as recited in claim 24, further comprising determining the order of the two or more movies based upon one or more preferences of the customer.

30. A computer-implemented method as recited in claim 24, wherein the delivery of the selected movie comprises delivery by mail.

31. A computer-implemented method as recited in claim 24, wherein the delivery of the selected movie comprises delivery by mail on one or more optical media.

32. A computer-implemented method as recited in claim 24, wherein the delivery criteria comprises receipt of the movie by mail.

33. A computer-implemented method as recited in claim 24, wherein a number of movies delivered to the customer and not yet returned does not exceed the specified number.

34. A computer-implemented method for renting movies to customers, the method comprising:
    establishing over the Internet a rental agreement with a customer that provides for charging the customer a periodic fee;
    providing electronic digital information that causes one or more attributes of movies to be displayed;
    establishing, in electronic digital form, from electronic digital information received over the Internet, a movie rental queue associated with a customer comprising an ordered list indicating two or more movies for renting to the customer;
    causing to be delivered to the customer up to a specified number of movies based upon the order of the list;
    in response to one or more delivery criteria being satisfied, if the customer is current on the periodic fee, selecting another movie based upon the order of the list and causing the selected movie to be delivered to the customer; and
    in response to other electronic digital information received from the customer over the Internet, electronically updating the movie rental queue.

35. A computer-implemented method as recited in claim 34, wherein updating the movie rental queue comprises changing the order of the two or more movies for renting to the customer.

36. A computer-implemented method as recited in claim 34, wherein updating the movie rental queue comprises indicating an additional movie in the ordered list.

37. A computer-implemented method as recited in claim 34, wherein updating the movie rental queue comprises removing an indication of one or more of the movies from the ordered list.

38. A computer-implemented method as recited in claim 34, wherein the two or more movies for renting to the customer are selected by the customer.

39. A computer-implemented method as recited in claim 34, further comprising determining the order of the two or more movies indicated by the movie rental queue based upon preferences of the customer.

40. A computer-implemented method as recited in claim 34, wherein the delivery of the selected movie comprises delivery by mail.

41. A computer-implemented method as recited in claim 34, wherein the delivery of the selected movie comprises delivery by mail on one or more optical media.

42. A computer-implemented method as recited in claim 34, wherein the receipt of the movie previously delivered to the customer comprises receipt by mail.

43. A computer-implemented method as recited in claim 34, wherein a number of movies delivered to the customer and not yet returned does not exceed the specified number.

44. A computer system for renting movies to customers, comprising:
    a computer that is coupled to a digital telecommunications network by a digital telecommunications link;
    an electronic digital memory in the computer;
    one or more sequences of computer program instructions stored in the electronic digital memory which, when executed, cause the computer to perform the steps of:
        providing electronic digital information that causes one or more attributes of movies to be displayed;
        establishing, in electronic digital form, from electronic digital information received over the Internet, a movie rental queue associated with a customer comprising an ordered list indicating two or more movies for renting to the customer;
        causing to be delivered to the customer up to a specified number of movies based upon the order of the list;
        in response to one or more delivery criteria being satisfied, selecting another movie based upon the order of the list and causing the selected movie to be delivered to the customer; and
        in response to other electronic digital information received from the customer over the Internet, electronically updating the movie rental queue.

45. A computer system as recited in claim 44, wherein the other electronic digital information specifies changing the order of the two or more movies for renting to the customer.

46. A computer system as recited in claim 44, wherein the other electronic digital information specifies an additional movie to add to the ordered list.

47. A computer system as recited in claim 44, wherein the other electronic digital information specifies removing an indication of one or more of the movies from the ordered list.

48. A computer system as recited in claim 44, wherein the delivery of the selected movie comprises delivery by mail.

49. A computer system as recited in claim 44, wherein the delivery of the selected movie comprises delivery by mail on one or more optical media.

50. A computer system as recited in claim 44, wherein the delivery criteria comprise receipt by mail.

51. A computer system as recited in claim 44, wherein a number of movies delivered to the customer and not yet returned does not exceed the specified number.

* * * * *